(12) United States Patent
Madle et al.

(10) Patent No.: US 7,235,603 B2
(45) Date of Patent: Jun. 26, 2007

(54) AMBIENT CURABLE POLYMER

(75) Inventors: Thomas Glenn Madle, Flourtown, PA (US); Matthew Stewart Gebhard, New Britain, PA (US); Chao-Jen Chung, North Wales, PA (US); Gary David Greenblatt, Rydal, PA (US)

(73) Assignee: Rohm and Haas Company, Philadelphia, PA (US)

( * ) Notice: Subject to any disclaimer, the term of this patent is extended or adjusted under 35 U.S.C. 154(b) by 399 days.

(21) Appl. No.: 10/802,638

(22) Filed: Mar. 17, 2004

(65) Prior Publication Data

US 2004/0198903 A1 Oct. 7, 2004

Related U.S. Application Data

(60) Provisional application No. 60/460,947, filed on Apr. 7, 2003.

(51) Int. Cl.
*C08G 18/82* (2006.01)
*C08G 2/32* (2006.01)

(52) U.S. Cl. ............ 525/111.5; 525/301; 524/531; 524/800

(58) Field of Classification Search .......... 525/111.5, 525/301; 524/531, 800
See application file for complete search history.

(56) References Cited

U.S. PATENT DOCUMENTS

| 4,244,850 | A | | 1/1981 | Mylonakis |
| 4,325,856 | A | | 4/1982 | Ishikawa et al. |
| 4,482,691 | A | * | 11/1984 | Saunders et al. ............. 528/69 |
| 5,306,744 | A | | 4/1994 | Wolfersberger et al. |
| 5,484,349 | A | | 1/1996 | Ra et al. |
| 5,559,192 | A | | 9/1996 | Bors et al. |
| 6,174,948 | B1 | | 1/2001 | Thames et al. |
| 2002/0147270 | A1 | | 10/2002 | Kuo et al. |
| 2004/0010071 | A1 | | 1/2004 | Gebhart et al. |
| 2004/0102568 | A1 | | 5/2004 | Bridgewater et al. |

FOREIGN PATENT DOCUMENTS

| DE | 3400966 A1 | | 7/1985 |
| DE | 4105134 C | * | 10/1992 |
| EP | 0022633 | | 2/1985 |
| EP | 0273795 A2 | | 7/1988 |
| EP | 0270427 B1 | | 1/1991 |
| EP | 1142915 A1 | | 4/2001 |
| JP | 59152965 A | * | 8/1984 |
| JP | 60221469 A | * | 11/1985 |
| JP | 60250072 A | * | 12/1985 |
| WO | WO 98/20052 | | 5/1998 |

* cited by examiner

*Primary Examiner*—David W. Wu
*Assistant Examiner*—Satya Sastri
(74) *Attorney, Agent, or Firm*—Andrew E. C. Merrian

(57) ABSTRACT

An ambient curable aqueous dispersion of polymer particles containing pendant ethylenically unsaturated side chains; a method of applying to a substrate a coating composition containing the aqueous dispersion of polymer particles; and a method of making the aqueous dispersion of polymer particles are provided.

2 Claims, No Drawings

AMBIENT CURABLE POLYMER

CROSS REFERENCE TO RELATED PATENT APPLICATIONS

This is a non-provisional application of prior pending U.S. provisional application Ser. No. 60/460,947 filed Apr. 7, 2003.

The present invention relates to an ambient curable aqueous dispersion of polymer particles containing pendant ethylenically unsaturated side chains; a method of applying to a substrate a coating composition containing the aqueous dispersion of polymer particles; and a method of making the aqueous dispersion of polymer particles.

Aqueous coating compositions include dispersions of various particles, including polymer particles. Many useful properties of the applied coating composition are enhanced by crosslinking the polymers contained in the coating composition, after the aqueous coating composition has dried, thereby causing the coating composition to cure. Properties that are generally enhanced by crosslinking include solvent resistance, dirt pickup, adhesion, print and block, mar resistance, and tensile strength, among others. Coating compositions frequently require the application of heat in order to crosslink the polymer particles, thus curing the coating composition. The requirement of the application of heat is a disadvantage in that heating capability may not always be available. Alternatively, curing can be achieved by autooxidation of chemical groups on the polymer particles in the coating composition. A disadvantage of many conventional ambient curing coating compositions is the length of time required for the completion of the curing process. Ambient curing coating compositions based on olefinic chemistries are particularly desirable in light of the growing need for renewable technologies, as well as the unique features obtainable from such coating compositions.

U.S. Pat. No. 4,244,850 discloses an air curable latex coating composition containing aqueous emulsion copolymer particles having ethylenically unsaturated side chains and a drier salt in solution in water immiscible organic solvent emulsified in the latex. The aqueous emulsion copolymer particles are prepared by the polymerization of monomers including from 1 to 20 weight percent of a monoethylenically unsaturated (meth)acrylate monomer containing carboxyl or 1,2-epoxy reactive groups, followed by the reaction in the latex of the selected reactive groups with a monoethylenically unsaturated monomer carrying the other type of reactive group, to provide unsaturated groups on the latex polymer. The ethylenically unsaturated side chains of this invention are not formed by the reaction of at least one co-reactive olefinic material with at least one epoxy group on a precursor polymer, and the composition does not crosslink appreciably under ambient conditions within a useful timeframe.

Applicants have discovered that an ambient curable aqueous dispersion of polymer particles can be made by preparing, by free radical addition polymerization, a precursor polymer containing epoxy groups, and then reacting the epoxy groups with an olefinic material to produce a first stage polymer containing epoxy groups and pendant ethylenically unsaturated side chains. Applicants have further discovered that where the polymer particles have more than one stage, and further include carboxylic acid functionality, the stability of the polymer can be maintained by incorporating that carboxylic acid functionality in a different polymer stage. Aqueous coating compositions containing the polymer particles of the present invention maintain a desirable balance of properties, for example, they exhibit good hardness, solvent resistance, dirt pickup resistance, print resistance, block resistance, and chemical resistance.

In a first aspect of the present invention there is provided an aqueous dispersion of polymer particles comprising, polymer particles having one or more stages, said polymer particles comprising: particles comprising: (i) from 10% to 100% by weight of a first stage polymer containing at least one pendant ethylenically unsaturated side chain, wherein said pendant ethylenically unsaturated side chain has been formed by the reaction of at least one co-reactive olefinic material with at least one epoxy group on a precursor polymer; (ii) from 0% to 20% by weight of a second stage polymer comprising from 2% to 50% by weight of a copolymerized monomer having carboxylic acid functionality; and (iii) from 0% to 70% by weight of a third stage polymer, said third stage polymer having no epoxy functionality, and less than 2% by weight of a copolymerized monomer having carboxylic acid functionality.

In a second aspect of the present invention there is provided a method of preparing an aqueous dispersion of polymer particles, said method comprising the steps of: ((i) preparing polymer particles having one or more stages, by: (a) preparing a first stage polymer containing at least one epoxy group and at least one pendant ethylenically unsaturated side chain by: (I) preparing a precursor polymer containing at lest one epoxy group by the free radical addition polymerization of at least one ethylenically unsaturated monomer, and then (II) forming at least one pendant ethylenically unsaturated side chain on said precursor polymer by reacting said at least one epoxy group on said precursor polymer with at least one co-reactive olefinic material; (b) optionally preparing a second stage polymer comprising from 2% to 50% by weight of a copolymerized monomer having carboxylic acid functionality; and (c) optionally preparing a third stage polymer, said third stage polymer having no epoxy functionality, and less than 2% by weight of a copolymerized monomer having carboxylic acid functionality.

In a third aspect of the present invention there is provided a method of ambient curing a coating composition on a substrate, comprising the steps of: (a) forming a coating composition comprising an ambient curable aqueous dispersion of polymer particles having one or more stages comprising: (i) from 10% to 100% by weight of a first stage polymer containing at least one pendant ethylenically unsaturated side chain, wherein said pendant ethylenically unsaturated side chain has been formed by the reaction of at least one co-reactive olefinic material with at least one epoxy group on a precursor polymer; (ii) from 0% to 20% by weight of a second stage polymer comprising from 2% to 50% by weight of a copolymerized monomer having carboxylic acid functionality; and (iii) from 0% to 70% by weight of a third stage polymer, said third stage polymer having no epoxy functionality, and less than 2% by weight of a copolymerized monomer having carboxylic acid functionality; and (a) applying said coating composition to a substrate; and (b) drying, or allowing to dry said coating composition.

The composition and method(s) of this invention relate to an ambient curable aqueous dispersion containing polymer particles having one or more stages. The polymer particles having more than one stage contain at least two mutually incompatible polymer compositions which form at least two phases within the polymer particles. The multistage polymer particles are prepared by a process in which at least two stages differing in composition are polymerized in sequential fashion. Such polymer particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the polymer particle will be occupied by at least one outer phase and the interior of the particle will be occupied by at least one inner phase.

At least one of the polymer stages is a polymer containing at least one pendant ethylenically unsaturated side chain. By "pendant" is meant herein attached to the precursor polymer and available for further reaction. This polymer stage, the first polymer stage, makes up from 10 to 100 weight percent, preferably from 25 to 100 weight percent, more preferably from 40 to 100 weight percent, of the polymer particles. The pendant ethylenically unsaturated side chain on the first stage polymer is formed by the reaction of a co-reactive olefinic material with at least one epoxy group on a precursor polymer. By "co-reactive" is meant herein that the olefinic material contains groups that are capable of reacting with an epoxy group. Suitable co-reactive groups include, for example, acid, amine, and hydroxyl groups. By "olefinic material" is meant herein a hydrocarbon compound containing at least one C—C double bond which is not adjacent to a carboxyl group as in (meth)acrylate esters or acids. The selection of the olefinic material determines the degree of yellowing and the curing time of the composition containing the aqueous dispersion of the present invention. Different olefinic materials can be used in combination with each other to vary the degree of yellowing, or the curing time. In those embodiments in which short curing time is desired, preferably the olefinic material contains three or more double bonds. In those embodiments in which reduced yellowing is desired, preferably the olefinic material contains two double bonds. Preferred olefinic materials for reduced yellowing include for example, fatty acids, fatty alcohols or fatty amines of linoleic oil and dehydrated castor oil. The double bonds may or may not be conjugated, depending on the properties desired. In those embodiments in which the olefinic material has non conjugated double bonds, compositions containing the aqueous dispersions of the present invention tend to have longer curing time and reduced yellowing. In those embodiments in which the olefinic material has conjugated double bonds, compositions containing the aqueous dispersions of the present invention tend to have shorter curing time and increased yellowing. In those embodiments in which the autooxidation takes place in the absence of a metal ion catalyst, triply unsaturated olefinic material containing conjugated double bonds (e.g fatty acids, fatty alcohols or fatty amines of tung oil) is preferred.

The precursor polymer containing at least one epoxy group is prepared by the free radical addition polymerization of at least one ethylenically unsaturated monomer having epoxy functionality. Suitable ethylenically unsaturated epoxide functional monomers include, for example, glycidyl acrylate, glycidyl methacrylate, glycidyl cinnamate, and allyl glycidyl ether. From 2 to 50 weight percent, preferably 5 to 40 weight percent, more preferably 10 to 35 weight percent of the precursor polymer is a copolymerized ethylenically unsaturated epoxide functional monomer. Other suitable other ethylenically unsaturated monomers include, for example amides such as (meth)acrylamide, propenamide, dimethylacrylamide; esters such as methyl acrylate, ethyl acrylate, butyl acrylate, propyl acrylate, 2-ethylhexyl acrylate, hydroxyethyl acrylate, methyl methacrylate, hydroxyethyl methacrylate, hydroxymethyl acrylate, hydroxymethyl methacrylate, hydroxypropyl acrylate, hydroxypropyl methacrylate. Phosphoethyl (meth)acrylate; vinyl monomers such as vinyl chloride, vinylidine chloride, vinyl toluene, N-vinyl pyrollidone, vinyl benzophenone, vinyl acetate, vinyl proprionate, or other vinyl esters; nitriles such as acrylonitrile; styrene or alkyl-substituted styrene; butadiene; methylal acrylamide; polyethylene glycol; sodium vinyl sulfonate; sodium styrene sulfonate and combinations of the foregoing.

In one embodiment of the present invention, at least one of the polymer stages has from 0.1% to 12.5% by weight, based on dry polymer weight of that stage, of an aldehyde reactive group-containing monomer. By "aldehyde reactive group-containing monomer" is meant herein a monomer which, in a homogeneous solution containing 20% by weight of the monomer and an equimolar amount of formaldehyde a pH from 1 to 14, will exhibit greater than 10% extent of reaction between the monomer and formaldehyde on a molar basis within twenty four hours, at 25° C. Ethylenically-unsaturated aldehyde reactive group-containing monomers suitable for the present invention include, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth)acryloxyethyl)-morpholinone-2, 2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth)acryloxyethyldimethyl-β-propiobetaine, diethanolamine monovinyl ether, o-aniline vinyl thioether, (meth)acryloxyacetamido-ethylethyleneurea, ethyleneureidoethyl (meth)acrylate, (meth)acrylamidoethyl-ethyleneurea, (meth)acrylamidoethyl-ethylenethiourea, N-((meth)acrylamidoethyl)-$N^1$-hydroxymethylethyleneurea, N-((meth)acrylamidoethyl)-$N^1$-methoxymethylethyleneurea, N-formamidoethyl-$N^1$-vinylethyleneurea, N-vinyl-$N^1$-aminoethyl-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth)acrylate, N-2-(allylcarbamoto)aminoethyl imidazolidinone, 1-(2-((2-hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethyaminoethyl methacrylate, and ethylenically unsaturated monomers containing aziridine functionality. Preferred is from 0.25% to 5%, by weight based on total monomer weight, of a copolymerized ethylenically-unsaturated aldehyde reactive group-containing monomer, based on the weight of the polymer. Preferred aldehyde reactive group-containing monomers are those containing a ethyleneureido groups, or an acetoacetoxy group. Also advantageous are compositions containing both ethyleneureido and acetoacetoxy aldehyde reactive group-containing monomers.

The at least one epoxy group is reacted with at least one co-reactive olefinic material, resulting in the formation of at least one pendant ethylenically unsaturated side chain. The aqueous dispersion containing the first stage polymer contains from 10 to 150 mole percent, based on the total moles of the epoxy groups on the precursor polymer, of olefinic material. At least 10 weight percent, preferably at least 25 weight percent, more preferably at least 50 weight percent, even more preferably at least 75 weight % of that olefinic material is reacted with the epoxy groups on the precursor polymer. Examples of suitable olefinic materials include, for example fatty acids or fatty amines of corn oil, sunflower oil, castor oil, tung oil, linseed oil, soybean oil, tallow oil, canola oil, coconut oil, cottonseed oil, fish oil, oiticica oil, palm kernel oil, peanut oil, perilla oil, safflower oil, and walnut oil.

The polymer particles having the pendant ethylenically unsaturated side chains are autooxidizeable in the presence of oxygen. Without being bound by a specific mechanism, it is believed that autooxidizeable substances contain readily abstractable hydrogen atoms that undergo reactions with molecular oxygen to form hydroperoxides that can be reacted to form free radicals. Thus, the pendant ethylenically unsaturated side chains enable the composition of the present invention to be curable at ambient temperatures and above. By "curable" is meant that the polymers can crosslink at ambient temperatures, or above, by the covalent bonding of polymers to themselves and/or to other compounds. The composition of the invention therefore provides a crosslinking mechanism that is operative after completion of film formation of the composition containing the aqueous dispersion of the invention.

The aqueous dispersion of polymers of the present invention provide advantages over conventional polymers in which fatty acid monomers have been copolymerized with ethylenically unsaturated monomers, in that in the latter polymers, the presence of the ethylenically unsaturated monomers undesirably inhibits the polymerization of the fatty acid monomers. Thus, they make it difficult to reduce residual monomer levels to environmentally safe standards, and prevent air curing, over a useful timeframe, of the polymer dispersion containing the polymer.

In one embodiment of the present invention, in addition to the first stage polymer, the polymers in the aqueous dispersion further contain from 0% to 20% by weight, of a second stage polymer. The second stage polymer contains from 2% to 50% by weight, preferably from 10% to 45% by weight, more preferably from 20% to 40% by weight of a polymer having carboxylic acid functionality. It is well known in the art that polymers containing carboxylic acid functionality tend to react with polymers containing epoxy functionality. Applicants have discovered that, surprisingly, this crosslinking does not occur where the polymer containing epoxy functionality and the polymer having carboxylic acid functionality are present in separate stages of a multi-stage polymer particle. This is advantageous in the present invention because it enhances the stability of the polymer particles, and preserves the epoxy functionality on the precursor polymer for later reaction with at least one co-reactive olefinic material, thus enabling the formation of an ambient-curable polymer. Examples of carboxylic acid monomers suitable for the present invention include, for example acrylic acid, methacrylic acid, crotonic acid, itaconic acid, fumaric acid, and maleic acid.

In another embodiment of the invention, in addition to the first stage polymer, or in addition to the first and second stage polymer, the polymers in the aqueous dispersion further contain from 0 to 70 percent by weight, based on the total weight of the polymer particles, of a third stage polymer. The third stage polymer contains copolymerized ethylenically unsaturated polymers, has no epoxy functionality, and contains less than 2% by weight of a copolymerized monomer having carboxylic acid functionality. Optionally, the third stage polymer contains from 0.1 to 10 mole percent of a copolymerized multiethylenically unsaturated monomer. Examples of suitable multiethylenically unsaturated monomers include, for example allyl methacrylate, diallyl phthalate, 1,4-butylene glycol dimethacrylate, 1,2-ethylene glycol dimethacrylate, 1,6-hexanediol diacrylate, and divinyl benzene. Optionally, the second stage polymer contains a crosslinker. In those embodiments of the invention in which improved solvent resistance of the composition containing the aqueous dispersion of the invention is desired, the second stage polymer is preferrably crosslinked. In those embodiments of the invention in which early hardness development, or improved block resistance of the composition containing the aqueous dispersion of the invention is desired, the second stage polymer is preferrably a hard polymer. By "hard polymer" is meant herein a polymer having a Tg of at least 25° C., preferably at least 35° C., more preferably at least 40° C., and which is not film forming at room temperature without the addition of coalescent or another film forming aid to lower the minimum film formation temperature of the hard polymer particles. In those embodiments of the invention in which flexibility of the composition containing the aqueous dispersion of the invention is desired, the second stage polymer is preferrably a soft polymer. By "soft polymer" is meant herein a polymer having a Tg of from −20° C. to 25° C., and which is film forming at room temperature without the addition of coalescent or another film forming aid.

The use of "first stage", "second stage" and "third stage" herein does not mean to exclude the possibility that one or more polymers can be interposed between, or formed on the different stages of the polymer particles. In addition, "first stage", "second stage" and "third stage" are not used to imply in what sequence the polymers are formed.

Volatile organic compounds are often deliberately added to aqueous dispersions of polymer particles, such as paints and coatings, to improve the film properties of the coating, or to aid in the application properties of the coating. By "volatile organic compound" ("VOC") is meant herein a carbon containing compound that has a boiling point below 280° C. at atmospheric pressure, compounds such as water and ammonia being excluded from VOCs. Examples of VOCs include glycol ethers, organic esters, aromatic compounds, ethylene and propylene glycol, and aliphatic hydrocarbons. In one embodiment of the invention, the aqueous dispersion of the invention is a low VOC composition. By "low VOC composition" is meant herein an aqueous composition that contains less than 5% by weight, preferably less than 3% by weight, more preferably less than 1.7% by weight, even more preferably from 0.01% to 1.7% by weight VOC, based on the total weight of the aqueous composition, of a volatile organic compound. In yet another embodiment of the present invention, the aqueous composition has a pigment volume concentration (PVC) of up to 85 and has less than 1.7% VOC by weight, preferably a PVC of greater than 35 and less than 3% VOC by weight, and more preferably a PVC of up to 38 and has less than 5% VOC by weight, where the percent VOC is based on the total weight of the aqueous composition. The PVC is a measure of how 'binder-rich' a formulation is. It is calculated using the following formula (1):

$$PVC(\%) = \frac{\text{volume of pigment(s)} + \text{volume extender(s)}}{\text{volume of pigment(s)} + \text{volume extender(s)} + \text{volume binder(s)}} \times 100 \quad (1)$$

VOC levels can be reduced, by steam stripping, use of low VOC containing additives or non-VOC containing additives, or other conventional methods. For example, additives such as biocides, defoamers, soaps, dispersants, thickeners and coalescing agents, which typically account for about 0.1% VOC by weight based on the total weight of the aqueous composition, can be replaced by low-VOC or non-VOC versions. In yet another embodiment of the invention, the aqueous dispersion of the invention includes a non-VOC coalescent which is an amide or ester of a nonvolatile olefinic compound. By "coalescing agent" meant herein a compound that is added to an aqueous polymer dispersion, including a paint or coating, for the purpose of reducing the minimum film forming temperature (MFFT), as measured using ASTM test method D2354, of the aqueous polymer dispersion by at least 1° C. By "non-VOC coalescing agent" is meant herein a coalescing agent that has a boiling point above 280° C. at atmospheric pressure. Preferred in this embodiment of the invention are alkyl esters, amides, or ethers prepared from oils such as linseed oil, tung oil, dehydrated castor oil, soybean oil, tall oil, sunflower oil, and corn oil.

Optionally, the crosslinking of the aqueous dispersion can be accelerated. In one embodiment of the invention, this is achieved by adding a multi-functional primary or secondary amine, acid or alcohol to the aqueous dispersion of the present invention. The use of primary or secondary amines is particularly useful for two-pack systems. Hydrophilic amines are useful in one-pack systems. Examples of suitable diamines and triamines are Jeffamine® D-230, Jeffamine® D-400, Jeffamine® D-2000, Jeffamine® HK Jeffamine® Jeffamine® T-5000, Jeffamine® T-3000. Preferred are Jeffamine® D-230, Jeffamine® D-2000, and Jeffamine® D-400. Jeffamine® is a trademark of Huntsman Corporation, located in Houston Tex. In another embodiment of the invention, crosslinking of the polymer particles is accelerated by use of a metal ion catalyst during formation of the first polymer stage of the polymer particles. Examples of suitable metal ion catalysts (also known in the art as driers) include, for example, cobalt, zirconium, calcium, manganese, copper, zinc and iron. Simple salts such as halides, nitrates, and sulfates, or organic anions such as the acetate, naphthenate or acetoacetonate may also be used. The amount of metal ion catalyst used is low, and is generally in the range of 0.01 too 1% metal content by weight of the aqueous film forming composition in which the curable aqueous dispersion of the invention is used. The autooxidation process will take place without the metal ion catalyst, however, it may be considerably slower. If the metal ion catalyst used is cobalt, and true one pack stability is desired, it can be useful to include a volatile stabilizer such as ketone oxime or hindered aldehyde oxime. Specific examples include methyl ethyl ketone oxime, methyl butyl ketone oxime, 5-methyl-3-heptanone oxime, and cyclohexanone oxime. The exact function of the oxime is unclear, however it is believed to stabilize the cobalt by complex formation. The oxime stabilizer is typically used at 0.05% to 1% by weight of the aqueous film-forming composition containing the curable aqueous dispersion of the present invention.

The glass transition temperature (Tg) of the first stage polymer is preferably in the range of from −20° C. to 60° C. The Tg of the second stage polymer is preferably at least 5° C. above the temperature at which the first stage polymer is prepared. Preferably, the glass transition temperature of the second stage polymer is at least 100° C. The Tg of the third stage polymer is preferably from −40° C. to 100° C. The Tg of each of the polymer stages are as calculated using the Fox equation (T. G. Fox, Bull. Am. Physics Soc., Volume 1, Issue No. 3, page 123 (1956)). That is, for calculating the Tg of a copolymer of monomers M1 and M2:

$1/Tg(\text{calc.}) = w(M1)/Tg(M1) + w(M2)/Tg(M2)$, wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in °K. The Tg of the polymer particles can be reduced by increasing the number of pendant ethylenically unsaturated side chains on the precursor polymer.

The aqueous dispersion of polymer particles of the present invention is prepared by free radical addition polymerization. Such polymerization techniques, which include emulsion polymerization, are well known in the art. Thermal or redox initiation processes are suitable for the present invention. The reaction temperature is typically maintained at a temperature lower than 100° C. throughout the course of the reaction. Preferred is a reaction temperature from 45° C. to 95° C., preferably from 75° C. to 90° C., more preferably about 85° C.

As noted above, in one embodiment of the invention the polymer particles are stabilized by use of a second polymer stage containing from 2% to 50% by weight of a copolymerized monomer having carboxylic acid functionality. In another embodiment of the invention, the polymer particles are stabilized by addition of a surfactant stabilizer to the reaction mixture. Conventional surfactants suitable for the present invention include, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually from 0.1% to 6% by weight, based on the weight of monomer.

In a different embodiment of the invention, the polymer particles are stabilized by the use of water soluble, nonionic monomers, or their polymers, such as for example, dimethyl acrylamide, (meth)acrylamide, polyvinyl alcohol, hydroxyethyl (meth)acrylate, polyethylene oxide (meth)acrylate, polypropylene oxide (meth)acrylate, n-vinyl pyrollidone, polyvinyl pyrollidone, polyvinyl alcohol, hydroxyethyl cellulose, starch, and combinations of the foregoing.

Conventional free radical initiators may be used, such as, for example, hydrogen peroxide, sodium peroxide, potassium peroxide, t-butyl hydroperoxide, t-amyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.1% to 3% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Chain transfer agents may be used in the polymer particles of the present invention. Preferably, they are added to the first stage polymer. Examples of suitable chain transfer agents include, for example, halogen compounds such as tetrabromomethane; allyl compounds; or mercaptans such as alkyl thioglycolates, alkyl mercaptoalkanoates, esters of mercapto propanoic acid, and $C_4$–$C_{22}$ linear or branched alkyl mercaptans may be used to lower the molecular weight of the emulsion polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage. Preferred is the use of 0 wt % (weight percent) to 5 wt %, more preferred 0 wt % to 1wt %, most preferred 0 wt % to 0.5 wt % chain transfer agent, based on the total weight of monomer used to form the aqueous emulsion copolymer. To form the aqueous emulsion copolymer, it is effective to provide a GPC weight average molecular weight of 1,000 to 5,000,000.

In one embodiment of the invention, the first stage polymer is prepared by adding to a reactor a monomer mixture containing at least one ethylenically unsaturated monomer having epoxy functionality. The monomer mixture may be added neat or as an emulsion in water. Typically, the monomer mixture is fed to a reactor for a period of thirty minutes to three hours. The monomer mixture may be added in one or more additions or continuously, linearly or not, over the reaction period, or combinations thereof. Preferably, the monomer conversion is 99%, more preferably 99.9%, still more preferably 100%, based on the total weight of the monomer mixture, before the precursor polymer is reacted with the olefinic material. In one embodiment of the invention, up to 10% by weight of the olefinic material is added in the form of a salt. Suitable salts include, for example salts of lithium, sodium, potassium, rubidium, cesium, and francium. Sodium salts are preferred. Ammonium salts are not suitable for the present invention. The olefinic material is then added, and the reaction mixture is heated for 30 minutes to 24 hours, depending on how much of the olefinic material it is desired to incorporate in the precursor polymer, as well as the kinetics of incorporation of the specific type of olefinic material and the specific type of precursor polymer. The functionalization reaction is optionally catalyzed by strongly basic catalysts. Some strongly basic catalysts are preferred over others, depending on the type of polymer particle to be functionalized. Strongly basic catalysts suitable for the present invention include, for example trimethylamine, triethylamine, tripropylamine, tributylamine, diisopropylamine, diisobutylamine, dimethylethanolamine, methyldiethanolamine, triethanolamine, benzyldimethylamine, dibenzylmethylamine, tri(dimethylaminopropyl)amine, methyldicyclohexylamine, trimethylaminopropylethanolamine, pentamethyldipropylenetriamine, tetramethylammonium hydroxide, tetraethylammonium hydroxide, tetrapropylammonium hydroxide, tetrabutylammonium hydroxide, benzyltrimethylammonium hydroxide, dimethyldiethylammonium hydroxide, tetrabutylphosphonium hydroxide, bis(2,2,6,6-tetramethyl-4piperidyl) sebacate, triacetoneaminoalcohol, n-butyltriacetonediamine, N,N-bis(2-hydroxyethyl)-triacetone diamine. Where no secondary or tertiary amine catalyst is used, the reaction is preferably conducted under a pH of from 2 to 7.

Typically from 10% to 99%, preferably from 20% to 50%, more preferably 30% to 70% of the olefinic material is incorporated on the precursor polymer. Because the amount of olefinic material incorporated on the precursor polymer can vary considerably, the stoichiometry of the olefinic material and the epoxy groups does not have to be balanced. Preferably, the incorporation of the olefinic material occurs under continuous nitrogen inertion to prevent reaction of the olefinic material with oxygen, which would result in pre-crosslinking of the polymer particles.

The polymerization techniques used to prepare multistage emulsion polymers are well known in the art such as, for example, U.S. Pat. Nos. 4,325,856; 4,654,397; and 4,814,373. The fact that the first monomer mix added to the reactor is polymerized first does not necessarily mean that it will form the core of the multistage polymer. For example, a subsequently added monomer mix can be polymerized within the polymer formed by polymerization of the first monomer mix. In those embodiments of the invention in which the multistage polymer contains a crosslinked third stage polymer, the third stage polymer is preferably reacted first, ensuring that most of the crosslinker is consumed during the reaction to prevent the crosslinking of subsequently prepared polymer stages. The next polymer stage is prepared by adding a second monomer mix having a different composition from the preceding monomer mix. The process of adding and reacting monomer mixtures is continued until a polymer particle having the desired number of polymer stages has been prepared.

One aspect of the present invention is the use of the aqueous polymer dispersion of the invention in a coating composition. It is contemplated that such an aqueous coating composition may contain conventional coating adjuvants such as pigments, fillers, extenders, opaque polymers, tackifiers, emulsifiers, buffers, neutralizers, thickeners or rheology modifiers, humectants, wetting agents, biocides, plasticizers, antifoaming agents, colorants, waxes, anti-oxidants, and coalescing agents.

Coatings containing the aqueous dispersion of polymer particles of the invention are suitable for application onto a substrate to prepare a dry coating. Various techniques are employed to apply the coating onto a substrate including, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the applied coating may be in the range of 1 micron to 500 microns. The coating is applied onto a substrate as a single coat or multiple coats. After application, the applied aqueous polymer blend composition is typically allowed to dry at ambient conditions or alternatively dried by the application of heat to provide a dry coating. Drying is typically allowed to proceed under ambient conditions such as, for example, at 0° C. to 35° C.

The aqueous polymer blend composition is suitable for application onto various substrates including, for example, processed timber such as medium density fiber board, chip board, laminates; mineral substrates such as masonry, cement, fiber cement, cement asbestos, plaster, plasterboard, glazed and unglazed ceramic; metal substrates such as galvanized iron, galvanized steel, cold rolled steel, Zincalum metal, Zincalum II metal, aluminum, wrought iron, drop forged steel, stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

The dry coating prepared from the composition of the invention is suitable as a protective coating or an aesthetic coating. Examples of suitable coatings include architectural coatings such as interior and exterior paint coatings, including masonry coatings, wood coating and treatments; floor polishes; maintenance coatings such as metal coatings; paper coatings; and traffic coatings such as those coatings used to provide markings on roads, pavements, and runways.

The following examples are presented to illustrate the invention.

The Following Abbreviations Are Used Below:
NAPS is Sodium Persulfate
BMA is butyl methacrylacrylate
BA is butyl acrylate
Sty is styrene
EHA is 2-ethylhexyl acrylate
MMA is methyl methacrylate
MAA is methacrylic acid
GMA is Glycidyl Methacrylate
DDM is n-docecylmercaptan
BMP is Butyl Mercaptopropionate
ALMA is allyl methacrylate
t-BHP is t-butyl hydroperoxide (70% in water)
SSF is sodium sulfoxylate formaldehyde
FSH is ferrous sulfate heptahydrate
DCO is Dehydrated Castor Oil Fatty Acid
Linseed is Linseed Oil Fatty Acid
Tung is Tung Oil Fatty Acid
TBA is Tributylamine
DMBA is dimethybenzylamine

EXAMPLE 1

Synthesis of Emulsion Polymers

Example 1.1–1.7

Preparation of Single-Stage Polymers

Single-stage polymers (examples 1.1 through 1.8) are single-stage polymers which were prepared by a conventional gradual addition, thermally initiated, emulsion polymerization process. The quantity of each ingredient which was added is shown in Table 1.1. Monomer Emulsions (M.E.) were prepared by mixing the appropriate monomers with deionized (D.I.) water and a 34% aqueous solution of a disodium ethoxylated nonylphenol half ester of sulfosuccinic acid (Surf #1) according to Table 1.1. D.I. water and Surf #1. were charged to the reactor and heated to 89° C. under nitrogen. 9% by weight of the ME was added to the reactor at 89° C., followed immediately by the addition of the sodium persulfate (NAPS) catalyst. Ten minutes later the M.E. feed was gradually added to the reactor over 80 minutes along with the NAPS catalyst cofeed solution which was added over 90 minutes while maintaining the reaction temperature at 86° C. during the course of the polymerization. Line rinse was added at the end of the polymerization and the batch was held for an additional 20 mins at 86° C. Metal catalyst additive solution was then added to the reactor kettle followed by a cofeed of t-BHP and SSF over 20 minutes. At this point a solution of 10% by weight of the fatty acid to be used in the functionalization step was dissolved in a water with 1 equivalent of sodium hydroxide to make a 10% by weight aqueous solution of the sodium salt of the fatty acid. This aqueous solution of the sodium salt of the fatty acid was added to the kettle containing the previously formed polymer particle. After addition of the aqueous solution of the sodium salt of the fatty acid the remaining free fatty acid and amine catalyst were added to the kettle and the contents were heated between 30 minutes and 24 hrs. at 95° C. under nitrogen to react the oxidizeable fatty acid (OFA) additives with the emulsion. The reactor was then cooled to 25° C. and the reaction product was filtered. The compositions of the single-stage latex polymers prepared by this method are shown in Table 1.3.

Example 1.8–1.20

Preparation of Single-Stage and Multi-Stage Polymers

Single-stage and multi-stage polymers (Examples 1.8 through 1.20) were prepared by a conventional gradual addition, thermally initiated, emulsion polymerization process. The quantities of each ingredient are shown in Tables 1.3 and 1.4. Monomer Emulsions (M.E.) were prepared by mixing the appropriate monomers with D.I. water and either SURF #1 or a 28% aqueous solution of a Sodium salt of an alkyl Sulfate (Surf #2) surfactant according to Table 2.1 or Table 2.2. D.I. water and SURF #1 or SURF #2 were charged to the reactor and heated under a nitrogen.

In examples where SURF #1 was added to the reactor the NAPS catalyst was charged to the reaction kettle at 85° C. and the M.E. feed was gradually added to the reaction kettle over either 30 minutes (for multi-stage polymers) or 75 minutes (for single-stage polymers). A NAPS catalyst cofeed solution was started simultaneously with the M.E. feed and was added over 80 minutes while maintaining the reaction temperature at 85° C. In the multi-stage cases (examples 1.11 through 1.20 and 1.21) when the first ME feed was finished the NAPS cofeed was stopped and the reaction was held for 15 mins. at 86° C. In the multi-stage cases at the end of the 15 min. hold the NAPS cofeed was re-started along with the stage 2 M.E. feed which was added to the reactor over 40 mins. at 85° C. In examples where SURF #2 was added to the reactor a 7% portion of monomer emulsion#1 was added to the reaction kettle at 89° C. followed immediately by the addition of the NAPS. The reaction was then held for 10 minutes at 84° C. After the 10 minute hold M.E.#1 was fed to the reactor over 60 minutes at 84° C. In the multi-stage cases (examples 1.11 through 1.20) when the initial M.E.#1 feed was finished a line rinse was added to the reactor and the NAPS cofeed was stopped and the reaction was held for 20 mins. at 84° C. At the end of the 20 min. hold the NAPS cofeed was re-started along with ME#2 feed which was added to the reactor over 60 mins., the first 30 mins. at 84° C. and the remaining 30 mins. at 88° C.

In either of the 4 different cases (single-stage, multi-stage, SURF #1 or SURF #2 example) when the NAPS cofeed was finished feeding into the reactor a final line rinse was added to the reactor and the batch was held for an additional 20 mins at 85° C. Metal catalyst additive solution (FSH) was then added to the reactor. The kettle was heated between 30 mins. and 24 hrs. at 95° C. under nitrogen to react the oil additives with the emulsion. The reactor was then cooled to 35° C. and the reaction product was filtered. The compositions of the single-stage and multi-stage latex polymers prepared by this method are shown in Tables 1.3 and 1.4.

TABLE 1.1

Single-stage Polymer Ingredients

| | EXAMPLE: | | | | | | | | | |
|---|---|---|---|---|---|---|---|---|---|---|
| | 1.1 | 1.2 | 1.3 | 1.4 | 1.5 | 1.6 | 1.7 | 1.8 | 1.9 | 1.10 |
| Reactor | | | | | | | | | | |
| Di-ionized H2O | 1196 | 1196 | 1196 | 1196 | 1196 | 1081 | 898 | 1330 | 1330 | 1293 |
| Surf #1 (34%) | 7.0 | 7.0 | 7.0 | 7.0 | 7.0 | 7.0 | 7.0 | 6.1 | 6.1 | 6.1 |
| Surf #2 (28%) | — | — | — | — | — | — | — | — | — | 2.5 |
| M.E. | 104 | 104 | 104 | 104 | 104 | 104 | 104 | — | — | 64 |
| NAPS/D.I.H2O | 8.0/26 | 8.0/26 | 8.0/26 | 8.0/26 | 8.0/26 | 8.0/26 | 8.0/26 | 4.6/24 | 4.6/24 | 3.6/80 |
| Monomer Emulsion #1 | | | | | | | | | | |
| Di-ionized H2O | 243.7 | 243.7 | 243.7 | 243.7 | 243.7 | 243.7 | 243.7 | 369 | 369 | 516 |
| SURF #1 (34%) | 43.7 | 43.7 | 43.7 | 43.7 | 43.7 | 43.7 | 43.7 | 116 | 116 | 42 |
| Surf #2 (28%) | — | — | — | — | — | — | — | — | — | 27 |
| BMA | 86.5 | 86.5 | 86.5 | 86.5 | 86.5 | 212.7 | 129.7 | — | — | — |
| BA | — | — | — | — | — | — | 186 | — | — | 666 |
| Sty | 129.7 | 129.7 | 129.7 | 129.7 | 129.7 | 129.7 | 129.7 | — | — | 377 |
| MMA | 302.7 | 302.7 | 302.7 | 302.7 | 302.7 | 302.7 | 302.7 | 763 | 689 | — |
| GMA | 346 | 346 | 346 | 346 | 346 | 219.8 | 116.4 | 55.8 | 350.8 | — |
| EHA | — | — | — | — | — | — | — | 561 | 339 | — |
| N-DDM | 8.6 | 8.6 | 8.6 | 8.6 | 8.6 | 8.6 | 8.6 | — | — | — |
| BMP | — | — | — | — | — | — | — | — | — | 2.8 |
| Line Rinse | 40 | 40 | 40 | 40 | 40 | 40 | 40 | 36 | 36 | 92 |
| Initiator Cofeed | | | | | | | | | | |
| NAPS/D.I. H2O | 0.5/30 | 0.5/30 | 0.5/30 | 0.5/30 | 0.5/30 | 0.5/30 | 0.5/30 | 0.9/122 | 0.9/122 | 1.4/100 |
| Metal Catalyst Additive | | | | | | | | | | |
| FSH (0.15%) | 7.0 | 7.0 | 7.0 | 7.0 | 7.0 | 7.0 | 7.0 | 26.7 | 26.7 | 26.7 |
| Additive Cofeeds | | | | | | | | | | |
| t-BHP/D.I. H2O | 1/50 | 1/50 | 1/50 | 1/50 | 1/50 | 1/50 | 1/50 | 3/73 | 3/73 | 3/73 |
| SSF/D.I. H2O | 0.5/50 | 0.5/50 | 0.5/50 | 0.5/50 | 0.5/50 | 0.5/50 | 0.5/50 | 1.4/76 | 1.4/76 | 1.4/76 |
| Sodium Salt Fatty Acid Oil Additives | | | | | | | | | | |
| Soya (10%) | 405 | — | — | — | — | — | — | — | — | — |
| DCO (10%) | — | 405 | — | — | — | — | — | — | — | — |
| Linseed (10%) | — | — | 405 | — | 405 | 357 | 315 | — | 552 | 411 |
| Tung (10%) | — | — | — | 405 | — | — | — | 145 | — | — |
| Fatty Acid Oil Additives | | | | | | | | | | |
| Soya | 405 | — | — | — | — | — | — | — | — | — |
| DCO | — | 405 | — | — | — | — | — | — | — | — |
| Linseed | — | — | 405 | — | 405 | 253 | 121 | — | 405 | 411 |
| Tung | — | — | — | 405 | — | — | — | 58 | — | — |
| Amine Catalyst | | | | | | | | | | |
| DMBA | — | — | — | — | — | — | — | — | — | 11 |
| TBA | 14.7 | 14.7 | 14.7 | 14.7 | 14.7 | 9.6 | 5.1 | 12 | 15 | — |

Note:
All values are in grams

TABLE 1.2

Multistage Polymer Ingredients

| | EXAMPLE #: | | | | | | | | | |
|---|---|---|---|---|---|---|---|---|---|---|
| | 1.11 | 1.12 | 1.13 | 1.14 | 1.15 | 1.16 | 1.17 | 1.18 | 1.19 | 1.20 |
| Reactor | | | | | | | | | | |
| Di-ionized H2O | 1330 | 1330 | 1330 | 1330 | 1330 | 1293 | 1293 | 1293 | 1330 | 1330 |
| SURF #1 (34%) | 6.1 | 6.1 | 6.1 | 6.1 | 6.1 | — | — | — | 6 | 6 |
| SURF #2 (28%) | — | — | — | — | — | 2.5 | 2.5 | 2.5 | — | — |
| ME#1 | — | — | — | — | — | 64 | 64 | 64 | — | — |
| NAPS/D.I. Water | 4.6/24 | 4.6/24 | 4.6/24 | 4.6/24 | 4.6/24 | 3.6/80 | 3.6/80 | 3.6/80 | 4.6/24 | 4.6/24 |
| Monomer Emulsion #1 | | | | | | | | | | |
| Di-ionized H2O | 164 | 164 | 164 | 164 | 164 | 220 | 220 | 220 | 212 | 250 |
| SURF #1 (34%) | 38 | 38 | 38 | 38 | 38 | — | — | — | 49 | 58 |
| SURF #2 (28%) | — | — | — | — | — | 27 | 27 | 27 | — | — |
| MMA | 514 | 500 | 514 | 499 | 499 | — | — | — | 663 | 782 |
| EHA | 91 | 91 | 91 | 91 | 91 | — | — | — | 117 | 138 |
| GMA | — | — | — | — | — | — | — | — | — | — |
| BA | — | — | — | — | — | 399 | 399 | 399 | — | — |
| Sty | — | — | — | — | — | 259 | 277 | 294 | — | — |
| MAA | — | — | — | — | — | 7 | 7 | 7 | — | — |
| Allyl methacrylate | — | 15 | — | 15 | 15 | 35 | 17 | — | — | — |
| Line Rinse | 18 | 18 | 18 | 18 | 18 | 40 | 40 | 40 | 18 | 18 |
| Monomer Emulsion #2 | | | | | | | | | | |
| Di-ionized H2O | 205 | 205 | 205 | 205 | 205 | 296 | 296 | 296 | 157 | 120 |
| SURF #1 (34%) | 78 | 78 | 78 | 78 | 78 | 42 | 42 | 42 | 67 | 58 |
| MMA | 175 | 175 | 175 | 211 | 249 | — | — | — | 136 | 104 |
| EHA | 249 | 249 | 249 | 356 | 470 | — | — | — | 193 | 148 |
| GMA | 351 | 351 | 351 | 208 | 56 | 356 | 356 | 356 | 272 | 208 |
| BA | — | — | — | — | — | 267 | 267 | 267 | — | — |
| Sty | — | — | — | — | — | 76 | 76 | 76 | — | — |
| BMP | — | — | — | — | — | 2.8 | 2.8 | 2.8 | — | — |
| Line Rinse | 18 | 18 | 18 | 18 | 18 | 52 | 52 | 52 | 18 | 18 |
| NAPS Cofeed | | | | | | | | | | |
| NAPS/D.I. H2O | 0.9/122 | 0.9/122 | 0.9/122 | 0.9/122 | 0.9/122 | 1.4/100 | 1.4/100 | 1.4/100 | 0.9/122 | 0.9/122 |
| Metal Catalyst | | | | | | | | | | |
| FSH (0.15%) | 26.7 | 26.7 | 26.7 | 26.7 | 26.7 | 26.7 | 26.7 | 26.7 | 26.7 | 26.7 |
| Additive Cofeeds | | | | | | | | | | |
| t-BHP/D.I. H2O | 3/73 | 3/73 | 3/73 | 3/73 | 3/73 | 3/73 | 3/73 | 3/73 | 3/73 | 3/73 |
| SSF/D.I. H2O | 1.4/76 | 1.4/76 | 1.4/76 | 1.4/76 | 1.4/76 | 1.4/76 | 1.4/76 | 1.4/76 | 1.4/76 | 1.4/76 |
| Sodium Salt Fatty Acid Oil Additives | | | | | | | | | | |
| Linseed (10%) | 552 | 552 | — | — | — | 560 | 560 | 560 | 428 | 328 |
| Tung (10%) | — | — | 552 | 328 | 145 | — | — | — | — | — |
| Fatty Acid Oil Additives | | | | | | | | | | |
| Linseed | 405 | 405 | — | — | — | 411 | 411 | 411 | 314 | 240 |
| Tung | — | — | 405 | 240 | 58 | — | — | — | — | — |
| Amine Catalyst | | | | | | | | | | |
| DMBA | — | — | — | — | — | 11 | 11 | 11 | 14 | 14 |
| TBA | 15 | 15 | 12 | 13 | 12 | — | — | — | — | — |

Note:
All values are in grams

TABLE 1.3

Compositions of Single-stage Polymers

| Example | Composition Weight Ratio (% by weight) | Latex to OFA | Type OFA | % OFA Reacted* |
|---|---|---|---|---|
| 1.1 | 10BMA/15Sty/35MMA/40GMA//1.0DDM | 66//34 | Soya | 86.0 |
| 1.2 | 10BMA/15Sty/35MMA/40GMA//1.0DDM | 66//34 | DCO | 91.2 |
| 1.3 | 10BMA/15Sty/35MMA/40GMA//1.0DDM | 66//34 | Linseed | 91.0 |
| 1.4 | 10BMA/15Sty/35MMA/40GMA//1.0DDM | 66//34 | Tung | 90.7 |
| 1.5 | 16BMA/15Sty/35MMA/34GMA//1.0DDM | 66//34 | Linseed | 81.8 |

TABLE 1.3-continued

Compositions of Single-stage Polymers

| Example | Composition Weight Ratio (% by weight) | Latex to OFA | Type OFA | % OFA Reacted* |
|---|---|---|---|---|
| 1.6 | 25BMA/15Sty/35MMA/25GMA//1.0nDDM | 75//25 | Linseed | 89.1 |
| 1.7 | 21.5BMA/15Sty/35MMA/13.5GMA//1.0DDM | 85//15 | Linseed | 83.9 |
| 1.8 | 55MMA/41EHA/4GMA | 95//5 | Tung | 80.0 |
| 1.9 | 50MMA/25EHA/25GMA | 75//25 | Linseed | 89.3 |
| 1.10 | 47BA/27Sty/25GMA//0.4BMP | 75//25 | Linseed | 88.1 |

*% Oil Reacted was determined by potentiometric titration of the fatty acid to determine the amount of free acid which remains after the reaction.

TABLE 1.4

Compositions of Multi-stage Polymers

| Ex. | First Stage Composition (% by weight) | Second Stage Composition (% by weight) | Ratio of 1$^{st}$ to 2$^{nd}$ Stage | Ratio Of Latex to Oil | Oil type | % Reacted |
|---|---|---|---|---|---|---|
| 1.11 | 85MMA/15EHA | 23MMA/32EHA/45GMA | 44//56 | 75//25 | Linseed | 87.2 |
| 1.12 | 82.5MMA/15EHA/2.5 ALMA | 23MMA/32EHA/45GMA | 44//56 | 75//25 | Linseed | 85.1 |
| 1.13 | 85MMA/15EHA | 23MMA/32EHA/45GMA | 44//56 | 75//25 | Tung | 88.2 |
| 1.14 | 82.5MMA/15EHA/2.5 ALMA | 27MMA/46EHA/27GMA | 44//56 | 84//16 | Tung | 82.8 |
| 1.15 | 82.5MMA/15EHA/2.5 ALMA | 32MMA/61EHA/7GMA | 44//56 | 95//5 | Tung | 85.1 |
| 1.16 | 57BA/37Sty/5ALMA/1MAA | 38BA/11Sty/51GMA//0.4BMP | 50//50 | 75//25 | Linseed | 87.9 |
| 1.17 | 57BA/39.5Sty/2.5ALMA/1MAA | 38BA/11Sty/51GMA//0.4BMP | 50//50 | 75//25 | Linseed | 85.5 |
| 1.18 | 57BA/42Sty/1MAA | 38BA/11Sty/51GMA//0.4BMP | 50//50 | 75//25 | Linseed | 89.6 |
| 1.19 | 85MMA/15EHA | 23MMA/32EHA/45GMA | 56//44 | 80//20 | Tung | 86.9 |
| 1.20 | 85MMA/15EHA | 23MMA/32EHA/45GMA | 67//33 | 84//16 | Tung | 84.9 |

TABLE 1.5

Examples 1.1 to 1.21: Fatty Acid fictionalization step

| Ex. | Hold time for Functionalization at 95° C. (Hrs) | % solid Polymer | pH | gel[1] (g) | Particle size (nm)[2] |
|---|---|---|---|---|---|
| 1.1 | 6 | 40.8 | 8.9 | none | 174 |
| 1.2 | 7 | 40.7 | 9.9 | none | 212 |
| 1.3 | 6 | 40.3 | 11.0 | none | 164 |
| 1.4 | 6 | 40.0 | 10.9 | none | 164 |
| 1.5 | 23 | 40.3 | 8.4 | none | 177 |
| 1.6 | 9 | 39.1 | 10.4 | 0.75 | 107 |
| 1.7 | 24 | 39.5 | 9.3 | none | 126 |
| 1.8 | 30 | 40.0 | 8.4 | none | 102 |
| 1.9 | 7 | 42.1 | 10.7 | none | 148 |
| 1.10 | 5 | 41.9 | 10.7 | none | 304 |
| 1.11 | 7 | 42.0 | 10.2 | none | 117 |
| 1.12 | 5 | 42.0 | 10.6 | none | 270 |
| 1.13 | 8 | 41.3 | 8.9 | none | 105 |
| 1.14 | 8 | 40.1 | 7.9 | none | 100 |
| 1.15 | 9 | 40.7 | 9.2 | none | 140 |
| 1.16 | 9 | 40.9 | 8.2 | none | 142 |
| 1.17 | 7 | 41.3 | 9.6 | none | 142 |
| 1.18 | 13 | 40.9 | 9.6 | none | 125 |
| 1.19 | 5 | 41.9 | 10.2 | none | 108 |
| 1.20 | 6 | 41.8 | 10.0 | none | 238 |

[1] As determined by filtration of the functionalized emulsion polymer through 100/325U.S. Standard Sieve screens, and determining whether there was any unfilterable material present (given in grams).
[2] As determined by the Brookhaven B.I. 90 particle size analyzer Example 1.21

Preparation of a Multi-Stage Latex Polymer with GMA and MAA in Different Phases

This process involves a multi step process wherein an acid containing polymer is made first, followed by the preparation in the presence of the acid containing polymer of an additional polymer phase which contains GMA.

An acid containing polymer was formed in accordance with the process disclosed in U.S. Pat. No. 3,577,515. The acid containing polymer had a composition of 65% MMA/ 10% Sty/25% MAA with a Mw of 11,000. Following preparation of the acid containing polymer, the aqueous dispersion polymer is cooled and stored.

In the second step of the process a GMA polymer stage is prepared in the presence of the acid containing polymer. The following procedure is used. A monomer emulsion (ME) is prepared by mixing 243.7 g DI water, 43.75 g of a SURF #1, 86.5 gBMA, 129.7 Sty, 302.7 MMA, 346 g GMA, 8.65 g DDM, and 40 g DI rinse water. The monomer mixture is emulsified. To the reaction kettle is added 429.6 g DI water, 7.06 g SURF #1, 8.0 g NAPS dissolved in 26 g DI water, and 139 g of the acid containing polymer. The contents of the reaction kettle are heated to 89° C. The remainder of the ME and a separate initiator feed of 0.5 g NAPS dissolved in 30 g DI water are added to the reaction kettle over a period of 80 minutes while maintaining the contents of the kettle at 85–87° C. After completion of addition of the ME the reaction kettle is maintained at 85–87° C. for 20 minutes. 7 g of a 0.15% FSH solution is added to the kettle followed by simultaneous addition of a mixture of 1 g t-BHP in 50 g DI water, and 0.5 g SSF in 50 g DI water. This is fed into the reaction kettle over a period of 20 minutes while holding the contents at 85–87° C. The resulting latex is allowed to cool and is filtered.

Example 1.22

Preparation of a Multi Phase Latex Polymer with GMA and MAA in Different Phases and Having Pendant Multi-Ethylenically Unsaturated Groups An acid containing polymer is prepared by the technique of Example 1.21, as described above. In the second step of the process a GMA polymer stage is prepared in the presence of the acid containing polymer. The following procedure is used. A monomer emulsion (ME) is prepared by mixing 243.7 g DI water, 43.75 g of a SURF #1, 86.5 gBMA, 129.7 Sty, 302.7 MMA, 346 g GMA, 8.65 g DDM, and 40 g DI rinse water. The monomer mixture is emulsified. To the reaction kettle is added 429.6 g DI water, 7.06 g SURF #1, 8.0 g NAPS dissolved in 26 g DI water, and 139 g of the acid containing polymer. The contents of the reaction kettle are heated to 89° C. The remainder of the ME and a separate initiator feed of 0.5 g NAPS dissolved in 30 g DI water are added to the reaction kettle over a period of 80 minutes while maintaining the contents of the kettle at 85–87° C. After completion of addition of the ME the reaction kettle is maintained at 85–87° C. for 20 minutes, 7 g of a 0.15% FSH solution is added to the kettle followed by simultaneous addition of a mixture of 1 g t-BHP in 50 g DI water, and 0.5 g SSF in 50 g DI water. This is fed into the reaction kettle over a period of 20 minutes while holding the contents at 85–87° C. Next 404.9 g of a 10% aqueous solution of the sodium salt of linseed oil fatty acid are added to the reaction kettle. This was followed by addition of 404.9 g of linseed oil fatty acid and 18.7 g dimethylethylamine. The reaction kettle temperature is raised to 95° C. and held for 5 hours. The resulting polymer is then cooled to room temperature.

Comparative Examples C1.23–C1.24

Preparation of a Multi Phase Latex Polymer with GMA by Post-functionalizing MAA to a Polymer Backbone Containing GMA Comparative Example C1.23

Comparative Example C1.23 was prepared following the procedure described in U.S. Pat. No. 4,244,850. The patented latex is prepared by postfunctionalizing GMA to a polymer backbone containing Methacrylic Acid MAA. In order to illustrate that GAMAFAT latexes are chemically unique, the patented latex process described above must be altered so that it contains an unsaturated epoxide capable of forming an epoxy-functional copolymer. This can be done by reversing the order of the GMA and MAA, thereby creating an emulsion copolymer with MAA post-functionalized to a GMA-containing polymer backbone. In this experiment, the patented process was be repeated with the changes described above, i.e. a polymer synthesized with BA, MMA, and GMA, and subsequently post-functionalized with MAA.

The quantity of each ingredient which was added is shown in Table 1.6. Monomer Emulsions (M.E.) were prepared by mixing the appropriate monomers with D.I. water and a 23% aqueous solution of Surf #2 according to Table 1.6. D.I. water and Surf #2. were charged to the reactor and heated to 80° C. under nitrogen followed by the addition of 2.59 grams of the ME, followed by addition of the Sodium Carbonate and the NAPS catalyst which is fed to the kettle over 30 minutes. The M.E. feed was gradually added to the reactor over 150 minutes while maintaining the reaction temperature at 80° C. At the end of the polymerization the batch was held for an additional 30 mins at 80° C. Metal catalyst additive solution was then added to the reactor kettle followed by a cofeed of SSF over 30 minutes. At this point the methacrylic acid post functionalization materials were added to the kettle while holding the reaction at 80° for 30 minutes. The reactor was then cooled to 25° C. and the reaction product was filtered.

TABLE 1.6

Examples 1.23: Post-functionalized Polymer Ingredients

| Kettle Charges #: | Comparative Example C1.23 (g) |
|---|---|
| DI H2O | 376 |
| Surf #2 (23%) | 3.1 |
| M.E. | 2.59 |
| Sodium Carbonate | 0.5 |
| NAPS/H2O dilution | 1.9/12.9 |
| Monomer Emulsion | |
| Di-ionized H2O | 126.7 |
| SURF #2 (23%) | 22.3 |
| BA | 256.4 |
| MMA | 172.5 |
| GMA | 61.5 |
| Metal Catalyst Additive | |
| FSH (0.15%) | 1.3 |
| Additive Cofeeds | |
| SSF | 0.1 |
| Post Functionalization Additives | |
| MAA | 37.3 |
| Hydroquinone | 0.5 |
| Tetraethyl ammonium bromide | 0.9 |

Comparative Example C1.24

Comparative Example C1.24 is a BA and MMA copolymer latex which is absent of pendant ethylenically unsaturated groups. Example C1.24 was prepared by the following procedure. A monomer emulsion (ME) was prepared by mixing 621 g DI water, 22.2 g of a 58% by weight aqueous solution of a nonyl phenoxy polyethoxy sulfate salt (SURF #3), 982.9 g BA, 982.9 MMA, and 40.1 g MAA. The monomer mixture was emulsified. To the reaction kettle was added 1400 g DI water, and 10.4 SURF #3 which was heated to 84° C. Next, 110 g of the ME was added to the reaction kettle followed by 4 g of ammonium persulfate (APS) dissolved in 22 g of DI water. The remainder of the ME and a separate initiator feed of 1.8 g APS dissolved in 118 g DI water were added to the reaction kettle over a period of 105 minutes while maintaining the contents of the kettle at 83–85° C. After completion of addition of the ME the reaction kettle was maintained at 83–85° C. for 15 minutes and then allowed to cool to 75° C. A mixture of 25 g of 29% aqueous ammonium hydroxide diluted in 49 g DI water was added. The resulting comparative polymer composition, Example C1.24, had an average particle diameter of 108 nm, a viscosity of 152 cps, and a pH of 9.4

EXAMPLE 2

Preparation of Aqueous Coatings from Emulsion Polymers

Example 2.1

Example 2.1 was prepared by mixing 100 g of Example 1.1, 2.91 g Triton™ X-405 (70% in water), 3.06 g propylene glycol monobutyl ether (PnB), 1.02 g dipropylene glycol monobutyl ether (DPnB), and 29.8 grams of Drier Package 1 (DP-1). DP-1 is given in Table 2.1 and was prepared by mixing the listed ingredients.

TABLE 2.1

Drier Package 1

| Ingredient | Weight (grams) | Supplier |
|---|---|---|
| Water | 55.4 | |
| Acumer ™ 9400 | 13.86 | Rohm and Haas Co, located in Philadelphia, Pennsylvania |
| propylene glycol | 27.72 | |
| Intercar ™ Cobalt 6% | 2.28 | Akcros Chemicals America, located in New Brunswick NJ |
| Active ™ 8 | 0.68 | R. T. Vanderbilt Co., located in Norwalk CT. |

Examples 2.2–2.8

Examples 2.2–2.8 were prepared in the same manner as Example 2.1. Table 2.2 lists the ingredients used to prepare Examples 2.2–2.8.

TABLE 2.2

Ingredients Used to Prepare Examples 2.2–2.8

| Ex. | Latex (g) | Triton ™ X-405 (g) | PnB (g) | DPnB (g) | DP-1 (g) |
|---|---|---|---|---|---|
| 2.2 | 100 | 2.82 | 2.96 | 0.99 | 28.85 |
| 2.3 | 100 | 2.90 | 3.1 | 1.0 | 29.4 |
| 2.4 | 100 | 2.82 | 2.96 | 0.99 | 28.85 |
| 2.5 | 100 | 2.90 | 3.1 | 1.0 | 0.0 |
| 2.6 | 100 | 2.82 | 2.96 | 0.99 | 28.85 |
| 2.7 | 100 | 2.79 | 2.93 | 0.98 | 28.56 |
| 2.8 | 100 | 2.80 | 2.94 | 0.99 | 28.66 |

Comparative Example C9

Example C9 was prepared using the procedure for Example 2.1 with the following ingredients: 22.5 g Comparative A (DBH-10241), 0.72 g Triton™ X-405, 0.84 g PnB, 0.28 g DPnB, 0.82 g AcrySol™ RM-825, 5.88 g DP-1.

Examples 2.10–2.22

Examples 2.10–2.22 were prepared using the same procedure for Example 2.1. The ingredients used for Examples 2.10–2.22 are listed in Table 3. The drier package (DP-2) used in Examples 2.10–2.22 contained the following ingredients: 6.4 g Acumer™ 9400, 79.5 g Water, 14.1 Intercar™ Co (6%).

TABLE 3

Ingredients Used to Prepare Examples 2.10–2.22

| Ex. | Latex (100 g) | Triton ™ X-405 (g) | PnB (g) | DPnB (g) | DP-2 (g) |
|---|---|---|---|---|---|
| 2.10 | Ex. 1.7 | 1.1 | 4.5 | 1.5 | 4.9 |
| 2.11 | Ex. 1.8 | 1.2 | 6.3 | 2.1 | 4.9 |
| 2.12 | Ex. 1.9 | 1.2 | 3.1 | 1.1 | 4.9 |
| 2.13 | Ex. 1.10 | 1.2 | 3.1 | 1.1 | 4.9 |
| 2.14 | Ex. 1.11 | 1.2 | 3 | 1 | 4.9 |
| 2.15 | Ex. 1.12 | 1.2 | 3 | 1 | 4.9 |
| 2.16 | Ex. 1.13 | 1.1 | 4.5 | 1.5 | 4.9 |
| 2.17 | Ex. 1.14 | 1.2 | 3 | 1 | 4.6 |
| 2.18 | Ex. 1.15 | 1.2 | 3 | 1 | 4.9 |
| 2.19 | Ex. 1.16 | 1.2 | 3 | 1 | 4.7 |
| 2.20 | Ex. 1.17 | 1.2 | 3 | 1 | 4.7 |
| 2.21 | Ex. 1.18 | 1.2 | 4.5 | 1.5 | 4.9 |
| 2.22 | Ex. 1.19 | 1.2 | 6 | 2 | 4.9 |

Comparative Example C2.23

Example C2.23 was prepared using the procedure for Example 1 with the following ingredients: 25 g Example C1.24, 0.7 g Triton™ X-405, 0.75 g PnB, 0.25 g DPnB, and 1.2 g DP-2.

EXAMPLE 3

Coatings Property Measurements

The following test methods were used to assess Coatings Properties:

Swell Ratio Test Method

The degree of crosslinking "cure" that occurs for the latex polymers was determined using a solvent swell technique. The examples were drawn down at 250 μm wet over polypropylene. The coating was allowed to dry at 70° F./50% relative humidity (RH) for 14 days. A square measuring 1 cm by 1 cm was cut from the dried film and placed in methyl ethyl ketone which was saturated with water. Exposure to the solvent swells the polymer film. After soaking for 1 hour the dimensions of the film are measured and converted into a ratio of original volume to swollen volume. As a polymer becomes more crosslinked the degree of swelling decreases. A typical highly crosslinked polymer will have a swell ratio from 2–3.

Reverse Impact Test Method

The overall flexibility of the coatings was determined using reverse impact. The examples were drawn down at 175 μm wet over aluminum panels (A-412 supplied by Q-panel Cleveland Ohio). The coating was allowed to dry at 70° F./50% RH for 14 days. The reverse impact was determined following ASTM 2794. The panel was placed in the apparatus with the coating side face down, and a weighted ball was dropped on the coating causing deformation in the aluminum panel. The higher the weight is raised the greater the impact. The coating is rated visually for cracking and the highest in *lb reading which leaves the coating uncracked is recorded. The higher the in*lb value the greater the flexibility of the polymer film.

Minimum Film Forming Temperature

The method follows ASTM test method D-2354. The method involves determining the lowest temperature at which film will occur for a latex polymer.

Example 3.1

Comparison of Minimum Film Formation Temperature (MFFT) of a Two Stage Latex to a Single Stage Latex The MFFT was determined on Example 2.16, a two stage latex, and Example 2.10, a single stage latex. A lower temperature indicates that less cosolvent is required to achieve adequate film formation from the polymer. The results in Table 3.1 show that the two stage latex has an MFFT less than the single stage latex and thus is the preferred mode for obtaining lower VOC paints and coatings.

TABLE 3.1

MFFT for Single Stage and Multi-stage Polymers

| Example | Architecture | MFFT ° C. |
|---|---|---|
| Example 2.16 | two stage | <5 |
| Example 2.10 | single stage | 16 |

Swell Ratios of Examples

Example 3.2

Effect of Different Oils and the Presence of a Metal Drier

The swell ratios for Examples 2.1–2.5 and the comparative Example C2.9 were determined by the above method. The results are given in Table 3.2. The data shows that all of the oil modified latexes show substantial crosslinking, whereas Example C2.9 shows poor crosslinking. All of the oils work well, and it is not required that a $Co^{2+}$ drier be present in the film.

TABLE 3.2

Effect of Oil Selection and Metal Drier

| Example | Oil Type | $Co^{2+}$ Drier | Swell Ratio |
|---|---|---|---|
| 2.1 | Soya | yes | 2.83 |
| 2.2 | DCO | yes | 2.25 |
| 2.3 | Linseed | yes | 3.13 |
| 2.4 | Tung | yes | 1.8 |
| 2.5 | Linseed | no | 3.25 |
| C2.9 | NA | yes | >20 |

Example 3.3

Effect of Oil Level

The swell ratios for Examples 2.6–2.10 and comparative Example C2.23 were determined as described above. The results are given in Table 3.3. The results show that adequate crosslinking occurs with as little as 5% oil modification. When no oil modification is used then the polymer shows no evidence for crosslinking.

TABLE 3.3

Effect of Oil Level

| Example | oil type | % Oil on total polymer | swell ratio |
|---|---|---|---|
| 2.6 | Linseed | 34 | 3.13 |
| 2.7 | Linseed | 25 | 3.13 |
| 2.8 | Linseed | 15 | 5.4 |
| 2.9 | Tung | 5 | 5.75 |
| C2.23 | None | 0.0 | completely dissolved |

Example 3.4

Effect of Chain Transfer Agent

The swell ratios for Examples 2.6 and 2.12 were determined as described above. The results are given in Table 3.4. The results show that adequate crosslinking occurs with or without chain transfer agent to lower the molecular weight of the latex polymer.

TABLE 3.4

Effect Of Chain Transfer Agent

| Example | % nDDM on total polymer | swell ratio |
|---|---|---|
| 2.6 | 1 | 3.13 |
| 2.11 | 0 | 2.89 |

Example 3.5

Effect of Using a Polymer Having Two Stages

The swell ratios and reverse impact values were determined for Examples 2.11 and 2.12. These are given in Table 3.5. The results show that crosslinking is achieved in both the 1 and 2 stage polymers. For the two stage polymers there is a one phase which is oil modified, and one phase which is not. In addition, a substantial increase in impact resistance is seen for the two stage polymer. This indicates that the polymer film is much more flexible.

TABLE 3.5

Effect Of Using A Polymer Having Two Stages

| Example | # of stages | Reverse Impact (in * lb) | swell ratio |
|---|---|---|---|
| 2.11 | 1 | 2 | 2.89 |
| 2.12 | 2 | 40 | 2.83 |

Example 3.6

Effect of ALMA in a Two Stage Polymer

The swell ratios were determined for Examples 2.12 and 2.13. These are given in Table 3.6. The ALMA in Example 2.13 leads to a crosslinked phase. This precrosslinking of the polymer does not interfere with film formation and leads to a substantial improvement in the crosslink density, as evidenced by the lower swell ratio.

TABLE 3.6

Effect Of ALMA In A Polymer Having Two Stages

| Example | % ALMA | swell ratio |
|---|---|---|
| 2.12 | 0 | 2.83 |
| 2.13 | 2.5 | 1.84 |

Example 3.7

Effect of Oil Level in Polymer Having Two Stages

The swell ratios were determined for Examples 2.14–2.16. For comparison the swell ratio for single phase polymer Example 2.10 is also given. These are given in Table 3.7. The results show that a significant amount of cure occurs at as little as 5% oil modification. It is also shown that at 5% oil level the two phase polymer has a significantly lower swell ratio than the single phase polymer.

TABLE 3.7

Effect Of Oil Level In Polymer Having Two Stages

| Example | % Oil | swell ratio |
|---|---|---|
| 2.14 | 25 | 2.11 |
| 2.15 | 16 | 1.76 |
| 2.16 | 5 | 2.35 |
| 2.10 | 5 | 5.75 |

Example 3.8

Effect of ALMA in a Polymer Having Two Stages and a Soft Phase

The swell ratios and reverse impact values were determined for Examples 2.17–2.20, 2.11–2.13. These are given in Table 3.8. The results show that cure is independent of ALMA use levels. Impact values are good as well with all levels of ALMA. Comparison of Examples 2.18 and 2.19 (low Tg phase) relative to Examples 2.12 and 2.13 (high Tg phase) reveal that the improvement in impact seen for the two phase systems is better when the Tg of the non-oil modified phase is lower. The results for examples 2.19, 2.20, 2.11, 2.12 show that two phase polymers have a higher level of impact resistance indicating increased flexibility.

TABLE 3.8

Effect of ALMA in a polymer having two stages and a soft phase

| Example | % ALMA | # of Phases | Tg of non oil modified phase | Reverse Impact (in * lb) | swell ratio |
|---|---|---|---|---|---|
| 2.17 | 5 | 2 | low | 50 | 2.25 |
| 2.18 | 2.5 | 2 | low | 60 | 2.21 |
| 2.19 | 0 | 2 | low | >100 | 2.89 |
| 2.11 | 0 | 1 | — | 2 | 2.89 |
| 2.12 | 0 | 2 | high | 40 | 2.83 |
| 2.20 | 0 | 1 | — | 70 | 2.94 |
| 2.13 | 2.5 | 2 | high | 2 | 1.84 |

Example 3.9

Effect of Phase Ratios in Polymers Having Two Stages

The swell ratios were determined for Examples 2.12, 2.21, and 2.22. The results are given in Table 3.9. The results show that crosslinking can be obtained with non oil modified levels as high as 55% of the total polymer.

TABLE 3.9

Effect Of Phase Ratios In Polymers Having Two Stages

| Example | % non oil Modified phase on total | swell ratio |
|---|---|---|
| 2.12 | 33 | 2.83 |
| 2.21 | 44 | 2.30 |
| 2.22 | 55 | 2.11 |

What is claimed is:

1. A method of preparing an ambient curable aqueous dispersion of polymer particles, said method comprising the steps of:

(i) preparing polymer particles having one or more stages, by:

(a) preparing a first stage polymer containing at least one epoxy group and at least one pendant ethylenically unsaturated side chain by:

(I) preparing a precursor polymer containing at least one epoxy group by the free radical addition polymerization of at least one ethylenically unsaturated monomer, and then (II) forming at least one pendant ethylenically unsaturated side chain on said precursor polymer by reacting said at least one epoxy group on said precursor polymer with at least one co-reactive oletinic material;

(b) optionally preparing a second stage polymer comprising from 2% to 50% by weight of a copolymerized monomer having carboxylic acid functionality; and optionally preparing a third stage polymer, said third stage polymer having no epoxy functionality, and less than 2% by weight of a copolymerized monomer having carboxylic acid functionality.

2. The method as claimed in claim 1, wherein the said aqueous dispersion further comprises a strong base catalyst is chosen from trimethylamine, triethylamine, tripropylamine, tributylamine, dilsopropylamine, dilsobutylamine, dimethylethanolamine, methyldiethanolamine, triethanolamine, benzyldimethylamine, dibenzylmethylamine, tri(dimethylaminopropyl)amine, methyldicyclohexylamine, trimethylaminopropylethanolamine, pentamethyldipropylenetriamine, bis(2,2,6,6-tetramethyl-4piperidyl) sebacate, triacetoneaminoalcohol, n-butyltriacetonediamine, and N, N-bis(2-hydroxyethyl)-triacetone diamine.

* * * * *